DANIEL B. VINCENT
INVENTOR.

BY Parker and Walsh
ATTORNEYS

Jan. 7, 1958  D. B. VINCENT  2,818,917
PROCESS OF EVAPORATING MOISTURE FROM
SYRUP-FORMING SOLUTIONS
Original Filed June 27, 1949  4 Sheets-Sheet 3

DANIEL B. VINCENT
INVENTOR.
BY Parker and Walsh
ATTORNEYS

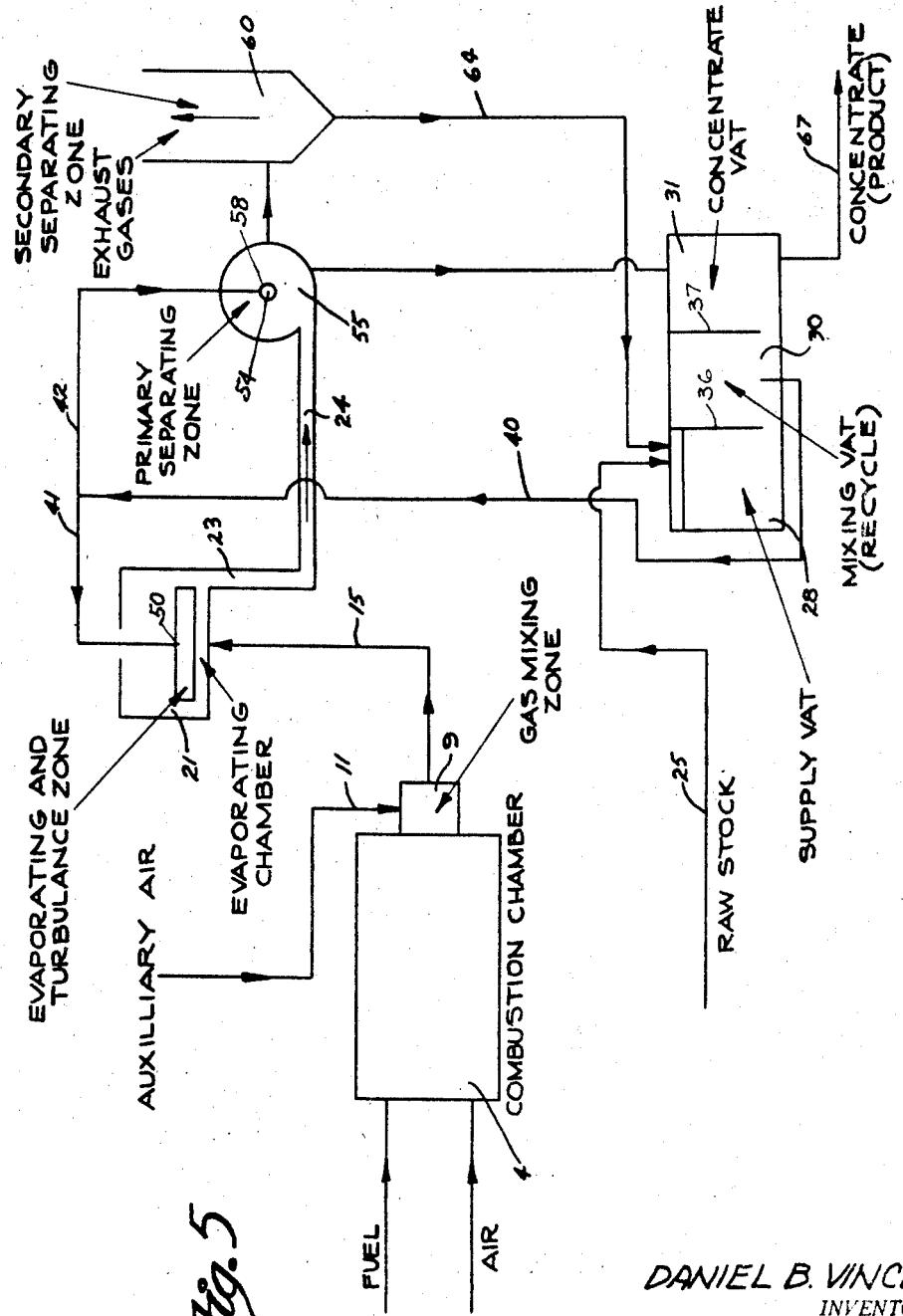

United States Patent Office 2,818,917
Patented Jan. 7, 1958

2,818,917

PROCESS OF EVAPORATING MOISTURE FROM SYRUP-FORMING SOLUTIONS

Daniel B. Vincent, Tampa, Fla., assignor to Prentice E. Edrington, Washington, D. C.

Original application June 27, 1949, Serial No. 101,662, now Patent No. 2,684,713, dated July 27, 1954. Divided and this application May 19, 1954, Serial No. 430,866

13 Claims. (Cl. 159—48)

This invention relates to a process, operating under atmospheric pressure conditions, for evaporating moisture from solutions and/or suspensions of materials which when concentrated tend to form syrupy gel-like, or sticky concentrates of substances which decompose when heated. This application is a division of my co-pending application, Serial No. 101,662, filed June 27, 1949, now Patent No. 2,684,713, issued July 27, 1954.

Applicant and others associated with him have been engaged in the development of apparatus and processes for concentrating materials such as citrus by-products to make citrus syrups and citrus molasses therefrom, for the production of useful gel-like and viscous concentrates obtained from the residue known as "fish stick" produced in the menhaden and related fishing industries, and for the concentration of wash waters obtained in the paper pulp and wall board industry all of which present difficult problems in the conventional heat exchanger or indirect heat type evaporator. These substances tend to precipitate sticky fractions during evaporation caused by breaking down or charring of the soluble portions and by the high percentage of insoluble particles which adhere to the tubes of the evaporator and progressively build up a scale which slows down and finally inhibits heat transfer. This difficulty usually occurs in the first effect where the steam temperature is in the range approximately 250° F. and the liquid temperature about 225° F. In the case of citrus molasses these steam tube evaporators must be drained of molasses every 72 hours and boiled out with caustic soda for 6 hours. Wood pulp wash waters give endless trouble and it is necessary to drain and clean the steam tube evaporators every day and once weekly to bore out the choked tubes with a special tool. In the fish industry the press liquors known as "stick waters" glue up the tube surfaces and frequently break down and spoil and become unfit for the market.

These products are usually high in moisture content, for example; citrus press waters average about 91 percent water, fish stick 94 percent water and wood wash waters from 93 to 96 percent water, and in many cases the finished product must be sold at a low price or even burned as fuel to prevent stream pollution. Fuel necessary for evaporating the water and the time required for draining and cleaning the equipment are therefore important factors in these fields. The foregoing substances are illustrative of fairly numerous types of solutions in which the crude solution contains appreciable quantities of water and less quantities of soluble and suspended matter, many of which possess much more value in concentrated form. Both in the illustrative types of solutions and in other related types of solutions, the crude or raw stock material is a relatively dilute solution which may contain oleaginous (i. e. fish oils) or non-oleaginous organic matter, in true solution, or in suspension or in the form of emulsions, and mixtures of the same.

All of these substances contain water soluble solids in solution and water insoluble solids in suspension which can be diluted and easily washed from metal surfaces if the metal surfaces are cooler than or not much hotter than the liquids containing the solids. Therefore if the evaporator is constructed and the processing conducted so that this is accomplished and if the liquids being concentrated are circulated in large quantities over the metal surfaces of the evaporator to keep them thoroughly washed and cleaned no sticking of the material being concentrated can occur and no shut down for cleaning the equipment is ever necessary. Also the suspended solids and concentrating liquids become thoroughly homogenized due to the rapid and constant mixing action of the pumps and fans during the recycle period. The final concentrate is therefore of better quality than other types as practically no solids precipitate during storage.

Therefore one object of this invention is to process materials of the indicated type in a manner such as to utilize the high efficiency of direct contact for heat transfer between a liquid and a gas.

Another object is to process such materials in a manner such that the liquid concentrating device in which the processing is performed is continuously self cleaning.

The present invention also has for one of its objects the control of evaporating conditions and the carrying out of the evaporating of the undesired moisture under such conditions that moisture is efficiently and quickly removed while the concentrate is obtained without raising the temperature of the decomposable materials to temperatures much in excess of 165° F., even though the system is maintained under atmospheric pressure and materials being concentrated are subjected to direct heat of heating gases which may be as hot as 1400° F. to 1900° F.

Another object of the present invention is the carrying out of the herein described process in such a manner as to avoid permitting the concentrating or concentrated materials from collecting at any stage or treatment wherein they would be subject to overheating with attendant decomposition, charring, or caramelization.

A further object of the present invention is to process materials of the indicated type so as to permit a rapid partial concentration of the raw material to produce, efficiently and continuously a partially finished, or partially concentrated product which may then be subjected to final concentration in a vacuum concentrator by use of all or part of the latent energy developed in the first effect, or preferably in a "second effect" evaporating system such as that illustrated in the prior application of Charles R. Picker, Serial No. 64,538, filed December 10, 1948, now abandoned. It may be observed that the present application is an improvement upon and a continuation in part of applicant's prior application, Serial No. 632,467, filed December 3, 1945, now abandoned. In said prior application, Serial No. 632,467, there is illustrated in Figure 1 of the drawings an arrangement of apparatus which is a germane variation of the disclosure of this application. There is also disclosed, in Figure 5 of said application Serial No. 632,467, an arrangement of apparatus in which the concentration of desired products is performed by passing the raw stock material successively through two generally similar evaporating units. It will be understood that the present invention contemplates as within its scope the duplication of the single illustrated evaporating chamber so as to pass the concentrating fluids through two or more units in a manner analogous to the system illustrated in Figure 5 of said prior application, utilizing part or all of the latent energy generated in the first effect as a source of energy for evaporation in the other effects.

Another object of the present invention is the avoidance of the skilled personal supervision required for prior art, multi-stage or batch operations and the expense, for equipment and operations, which attends vacuum processing in conventional vacuum systems.

In its broader aspects, the process of the invention involves passing a stream of the liquid to be concentrated into a high velocity stream of highly heated gases flowing counter-current thereto, passing the components of said streams through a zone of turbulence and at least partial vacuum, and then separating the gases and concentrated liquid. The process may be carried out continuously, in a closed system, and preferably under atmospheric pressure conditions.

In carrying out the process, a stream of highly heated combustion gases at high velocity and under atmospheric pressure, and a stream of the liquid to be concentrated, are simultaneously introduced into an evaporating zone, in counter-current flow relation along a common axis, and within the swept orbital space of rotation of a multi-bladed impeller, rotating at relatively high speed, thereby causing intimate turbulent mixing. The gases and liquid, thoroughly mixed and intermingled, pass outwardly between the blades of the impeller and are discharged from the evaporating zone into a cyclone-type separator where the gases and liquid are separated by centrifugal stratification and the latter recovered for use, or for further processing. Herein the movement of gases and liquid, even though rapid, is quiescent as distinguished from turbulent.

Following the above general description, the invention will now be described in detail in connection with the accompanying drawings, illustrating a preferred form of apparatus for carrying out the process, wherein:

Figure 5 is a flow-sheet which illustrates the steps of the process as carried out in an illustrative embodiment thereof.

Figure 1:
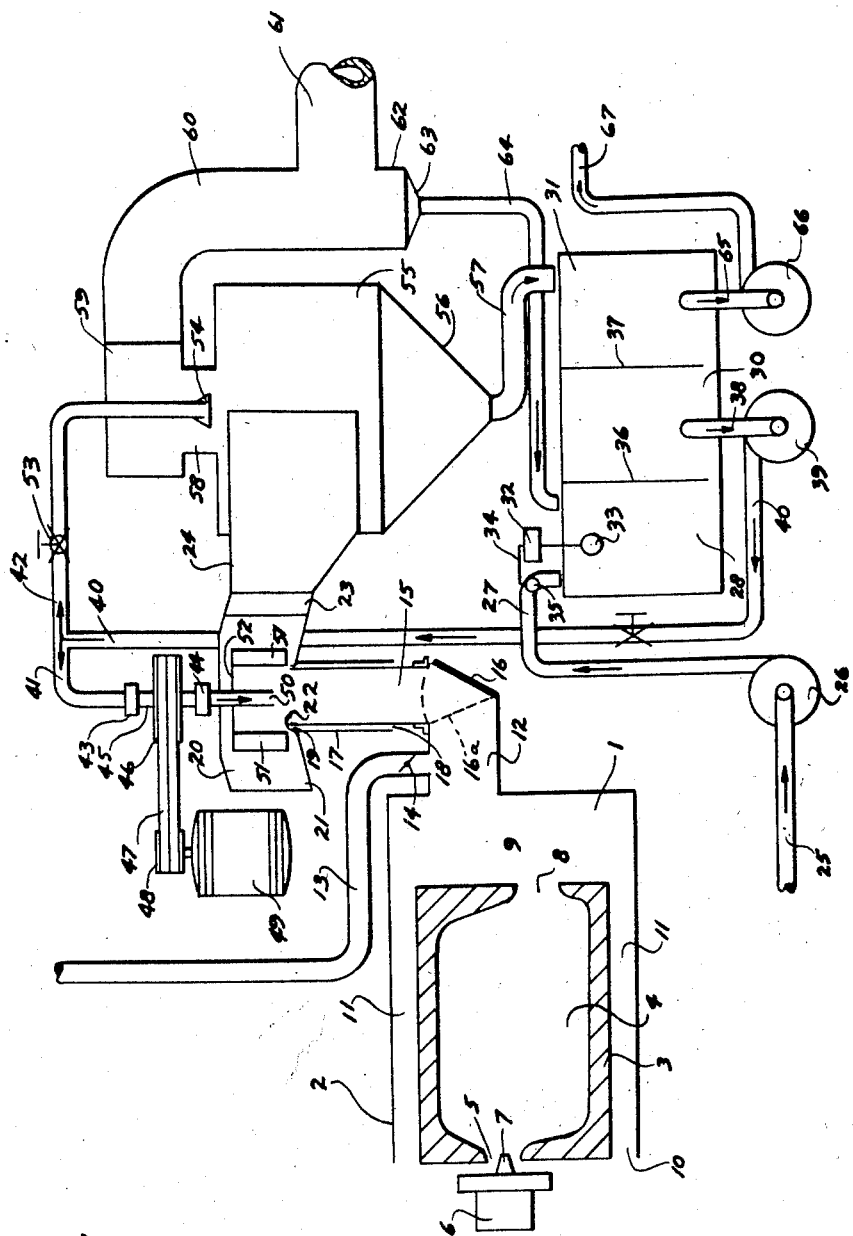
Figure 1 illustrates, somewhat diagrammatically, a side elevational view, partly in cross-section, of the apparatus.
Figure 2:
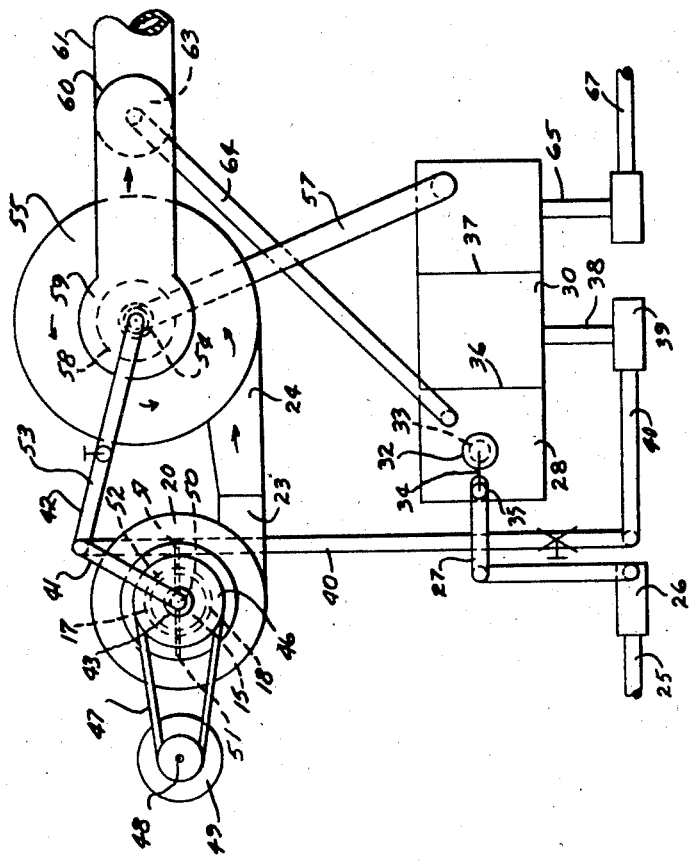
Figure 2 represents, somewhat diagrammatically, a partial top plan view of the apparatus.

Referring more particularly to Figures 1 and 2 of the drawings, 1 represents generally a furnace or heater which is provided with an exterior casing or jacket 2 within which and spaced from the jacket 2 is a combustion chamber 3 prepared of fire brick or suitable heat resistant material. Within the combustion chamber 3 is a primary combustion zone 4 provided at one end thereof with an inlet orifice 5 and at the other end with a discharge orifice 8. A suitable fuel burner 6 is located exterior of the furnace 1 and discharges the fuel for combustion through one or more nozzles 7 which are disposed in spaced relationship from the walls of the inlet orifice 5. Air necessary to support primary combustion of the fuel is introduced through orifice 5 and around fuel nozzles 7.

The hot products of primary combustion leave the combustion zone through the discharge orifice 8 and enter a gas mixing chamber 9 where the hot combustion gases are mixed with desired quantities of auxiliary air which enters the furnace from ports 10 and flows through conduits 11 between the walls of the exterior jacket 2 and the walls of the combustion chamber 3. The hot gases, containing desired amounts of auxiliary air, after mixing in gas chamber 9 pass into a flue 12 and thence upwardly into a cylindrical duct 15.

A suitable auxiliary stack 13 provided with a cut-off valve or damper 14 communicates with flue 12 in order to draw off combustion gases as during periods of shutdown. The cylindrical duct 15 has adjacent its bottom a damper or valve 16 which in open position permits duct 15 to communicate directly with flue 12 but which when moved to a position 16a serves to close off duct 15 and permit the by-passing of combustion gases and their discharge out of the auxiliary stack 13. Desirably, the cylindrical duct 15 will be surrounded by a spaced concentric outer jacket 17 which is open at the bottom to provide an air inlet 18 and which is vented at the top, as shown at 19, to permit the discharge of air. The purpose of this exterior jacket or sleeve 17 is to permit cooling air to be aspirated in the space between the jacket 17 and duct chamber 15 so as to cool the walls of the chamber somewhat and avoid overheating of the walls, also to form a cooling air cushion between the high temperature gases moving through duct 15 and the metal rolled lip 22, Figure 4.

The cylindrical duct 15 discharges at its upper end into a primary evaporating chamber generally designated 20 which is closed at its top, sides, and bottom by a housing. The bottom of the housing 21 has an inclined pitch downwardly and outwardly and terminates at its inner upper ends in an annular lip 22 which extends to a point somewhat above and inside of the path of rotation of the bottom inner edges of the fan blades. The bottom 21 of the housing also has a pitch in the general direction toward the duct 23 so as to permit fluids which collect in the bottom of the housing to flow by gravity toward and through duct 23. Duct 23 communicates with a somewhat larger duct 24 which travels generally horizontally and terminates tangentially with the housing of the primary separating chamber 55.

The raw feed stock or fluid to be concentrated is pumped from a suitable supply vat, not shown, through an inlet pipe 25 by means of pump 26 and discharged through pipe 27 into supply vat 28. Vat 28 communicates with recycle vat 30 through a bottom orifice at the base of baffle or partition 36. Similarly, recycle vat 30 communicates with concentrate vat 31 through a bottom orifice at the base of partition 37. The amount of raw stock or feed introduced through pipe 27 is controlled by control element 32 which operates in accordance with the liquid level in vat 28 responsive to the float 33. Control 32 may function through mechanical or electrical connections 34 to open and close control valve 35 placed in feed line 27, or alternatively control 32 may have suitable electrical connections, such as 34 to control the motor or pump 26 for continuous or intermittent operation thereof as desired.

A draw-off pipe 38 communicates with the body of liquid in recycle vat 30 to withdraw fluid therefrom, and by means of pump 39 pumps the withdrawn fluid through pipe 40 and thence to a T connection, one arm of which, 41, communicates with the interior of evaporating chamber 20 as will be further described and the other arm of which, 42, communicates with the interior of the primary separating chamber 55 as will be further described. Fluid flowing from pipe 40 through 41 then flows downwardly into shaft 45.

Shaft 45 is provided with suitable bearing blocks, gaskets and housings, designated 43 and 44, to permit rotation of shaft 45 around a vertical axis. Shaft 45 has mounted thereon a pulley 46 connected by belt 47 to pulley 48 mounted on the shaft of a suitable motor 49. The lower extremity of shaft 45 is open to provide a discharge orifice 50. Mounted on the shaft is a suitable gas impeller adapted for rotation simultaneously with and responsive to rotation of shaft 45. In Figure 1 of the drawings, the impeller is shown conventionally as having a supporting disc 52 and a plurality of blades or vanes 51. Desirably, the impeller may be constructed in accordance with the construction illustrated in Figure 3 of applicant's prior application Serial No. 632,467, now abandoned, or the fan structure illustrated in Figures 2, 3, 4, and 5 of prior application of Charles R. Picker, Serial No. 173, filed January 2, 1948, and now abandoned, may be employed. Regardless of which specific form of impeller blade structure is employed, it is important that the rotating shaft 45 be in axial alignment with the center of duct 15 and that the fluid discharge orifice or orifices 50 be placed just above the center of the gas discharge outlet at the top of duct 15. This concentric, opposed, relationship appears more clearly from the plan view illustrated in Figure 2 of the drawings. Figure 2 of the drawings also illustrates an important feature which is that discharge conduit 23 is arranged tangentially with respect to housing 20.

The primary separating chamber 55 consists of a generally cylindrical housing having a side opening therethrough which provides for the tangential introduction of gases which are discharged from chamber 24. Chamber 55 otherwise has its sides fully enclosed, has at the base thereof a conical collecting basin 56 which terminates in a liquid discharge pipe 57, which, in turn, conveys liquid into concentrate vat 31. A center opening is provided at the top of chamber 55 and a somewhat restricted throat 58 provides a conduit leading into a gas duct 59. The liquid pipe 42 referred to above is provided with a suitable control valve 53 and terminates in a perforated nozzle which is disposed centrally of, and preferably toward the bottom of, the restricted throat 58. Duct 59 communicates wtih the secondary separating chamber 60 which, in turn, communicates with a gas discharge flue 61. Chamber 60 has a collecting basin 62 which terminates in a conical basin 63 which discharges into pipe 64 which conveys fluid to supply vat 28.

Concentrate vat 31 is provided with a drawoff pipe 65 from which the concentrated product is pumped by pump 66 into a discharge line 67 where the concentrate may be stored as a product or for further treatment. Desirably, but not necessarily, flue 61 and product pipe 67 may communicate with a second effect concentrating system such as is disclosed in application Serial No. 64,538, now abandoned, filed December 10, 1948 by Charles R. Picker.

Figure 3:
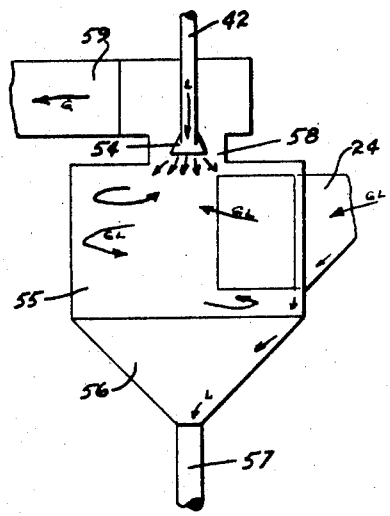
Figure 3 is a detailed side elevational view, somewhat diagrammatically, of the separating chamber.

Referring to Figure 3, which is a somewhat enlarged detailed view of the primary separating chamber 55, it will be noted that Figure 3 is a rear elevation, while in Figure 1, the same element is shown as a front elevation. The gases discharged into chamber 55 from duct 24 are introduced tangentially and under considerable velocity which permits the chamber 55 to function as a cyclone separator in which suspended droplets of liquid which have been carried along with the gases are thrown outwardly and against the interior walls of chamber 55 where they may drain downwardly and collect in basin 56. Since the solids present in these concentrated liquids have appreciable viscosity, it is possible for small droplets, ribbons, or streamers of concentrate to be carried by the gases. Where these particles are sufficiently light, there is a tendency for them to be carried upwardly through the throat 58 and thence into the secondary separating chamber. There is also a tendency for the concentrated liquids to tend to cling to the interior side walls of the primary separating chamber 55. To eliminate these two tendencies some of the less concentrated recycle stock is supplied through nozzle 54 and into chamber 55. A conical spray is preferred since in effect it provides a liquid baffle which washes the gases as they pass upwardly through it, thus removing entrained droplets or ribbons of concentrate. Moreover, since the wash liquid is recycle material and not the concentrated material, the washing fluid possesses less viscosity and aids in washing down the interior walls of the primary separating chamber. Moreover, this wash fluid having a lower temperature than the temperature of the effluent gases discharged from the primary separating chamber, has a further effect which will be discussed hereinafter.

Figure 4:
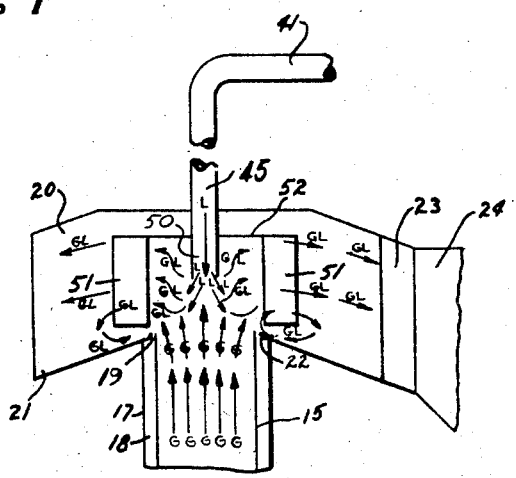
Figure 4 is a detail, rear elevation, partly in cross-section of the interior of the primary evaporating chamber.

Turning now to Figure 4 of the drawings which is a somewhat enlarged detail of the evaporating chamber, it will be noted that the gases rising through duct 15 enter into the space inside the path of rotation of the impeller blades 51, or stated in another way, such gases are discharged within the swept orbital space of rotation of the blades. A considerable amount of the gases after being discharged from the top of duct 15 will be caused to change their direction from vertical to approximately horizontal and will pass outwardly through the spaces between the impeller blades and in a direction toward the outer side edges of chamber 20. Naturally, since the impeller and its blades are rotating around a vertical axis, the gases, although traveling horizontally, will travel in paths which are more or less curved since the overall effect of the impeller is to create a cyclonic effect within chamber 20. Some of the gases, however, upon being discharged from impeller 51 will be caused to reverse their direction nearly 180° F. and will be swept downwardly under the bottom edges of the impeller blades. These gases perform a beneficial effect in carrying with them particles of solution which will tend to bathe the top edges of duct 15 and particularly the lips 22 so as to avoid overheating and possible decomposition or "caramelization" at this point. It will also be observed that the major course of travel of the gases being sucked upwardly through duct 15 is directionally opposed to the downward course of travel of the fluid being discharged through orifices 50 from rotating shaft 45. The downwardly moving fluids are in effect cushioned on the rising gases and are thrown outwardly and thoroughly intermingled with the gases even before the mixture of gases and liquid approaches the impeller blades per se. A considerable portion of the liquid so thrown out will impinge upon the surfaces of the impeller blades and will travel outwardly to the impeller blade edges.

The air outlet orifice 19 at the upper end of jacket 17, preferably terminates just under annular lip 22 so that the jacket air may be discharged into the interior of evaporating chamber 20. This small amount of additional air discharged into chamber 20 does not materially alter the temperature characteristics of the main stream of hot gases; nevertheless this air will be somewhat cooler than the temperature of the hot gases and will serve to keep lip 22 and the adjacent surfaces of bottom 21 somewhat cooler than they otherwise would be. It is extremely important to keep these particular metal surfaces as cool as possible since it is at this point so closely adjacent the inflowing stream of hot gases that the danger of decomposition and caramelization is greatest. To assist further the elimination of this danger, it will be noted that the impeller blades, operating slightly above bottom 21 of chamber 20, create a small area of partial vacuum and cause a recycle of gases backwardly and inwardly toward the axis of the rotating shaft and, of course, the axis of conduit 15. This recycle flow tends to pass the cooled gases inwardly and to bathe the surfaces of bottom 21 and lip 22 with a stream of relatively cool gas, which carries some entrained liquid which, in turn, washes the surfaces and prevents the accumulation of any sticky deposits with attendant decomposition. Arrows and symbols have been added on Figure 4 of the drawing to show the relative directions of desiccating gases (represented by arrows marked with a G) meeting the concurrent flow of liquids (designated as arrows marked with the letter L) which change direction and intermingle to form a fluid mixture of liquid and gases (designated as arrows marked with the symbol GL). The blades, since they are rotating rapidly in an essentially fluid medium, will create at the tip of each blade and immediately behind it an area of at least a partial vacuum. It is in this area that the preponderance of the evaporation of moisture appears to take place. After the drops or droplets of fluid have passed beyond the effective path of the impeller blades, they are thrown outwardly against the inner wall of chamber 20 where they are permitted to drain downwardly to the bottom and thence drain outwardly through duct 23. This discharging movement of the liquid through duct 23 is assisted by the concurrent flow of the gases.

The efficiency and economy of this apparatus is apparent from the following example of a typical commerical plant operation converting citrus cannery waste into valuable feed products according to applicants, U. S. Patent Re. 22,865.

The citrus fruit cannery waste is received into the mill at an average of 40,600 pounds per hour. After chemical treatment it is pressed into two products, 40 percent resulting in a press cake which is dried as a dairy feed and 60 percent, or to be exact for the present example 24,370 pounds, results as a press liquid containing 8½ percent of dissolved sugars, other organic solids and a suspension of fine particles of peel and pectous substances, the balance, or 91.5% being moisture. This press liquid is charged as the feed stock to the apparatus herein described through pipe 25. For simplicity in description the present invention may be described as a "first effect" system. Water is evaporated and removed in the first effect at a rate of 14,500 pounds per hour resulting in a concentrated thin syrup of approximately 21 Brix weighing approximately 9,870 pounds. This thin syrup may be pumped into a "second effect" concentrating system such as described in application Serial No. 64,538, filed December 10, 1948 by Charles R. Picker, now abandoned, in which the latent energy carried by the saturated gases from the first effect are released to evaporate an additional 7,000 pounds of water resulting in a finished syrup of approximately 72 Brix and weighing approximately 2,870 pounds. The whole evaporating operation in both first effect and second effect is accomplished by burning an approximate average of 87 gallons of fuel oil per hour. Since this fuel oil contains about 150,000 B. t. u.'s per gallon there is a heat release of 13,050,000 B. t. u.'s per hour. Assuming a requirement of 1,000 B. t. u.'s per pound of water evaporated, the 14,500 pounds of water removed in the first effect will have been evaporated at the apparent but unbelievable thermal efficiency of 115 percent. Actually, the excess B. t. u.'s are probably obtained from the electric energy used by the motor to drive the impeller. Since an additional 7,000 pounds of water is removed in the second effect without added fuel of heat fuel there will have been evaporated 21,500 pounds of water equivalent to a heat input of 21,500,000 B. t. u.'s on a fuel release of 13,050,000 B. t. u.'s or 607 B. t. u.'s per pound of water evaporated. The 2,870 pounds of molasses produced is equivalent, at 11 pounds per gallon, to 260 gallons. Therefore there was used .335 gallon of fuel oil per gallon of molasses produced.

The machine is capable of continuous operation, with only seasonal cleaning, at this uniform high efficiency whereas triple effect steam evaporators in the same locality are requiring .5 to .8 gallon of fuel oil per gallon of molasses produced because of boiler losses and the progressive scaling of the evaporator tubes between every 72 hour clean-out period.

In one modification of the invention the combustion zone 4 is usually approximately 3000° F., and in gas mixing chamber 9 the hot gases so produced are blended with auxiliary outside air to reduce the gas temperature of the mixed air and furnace gas to approximately 1400° F. For such combustion, about 4,500 cubic feet per minute of air is required for the primary combustion, while about 5,450 cubic feet per minute of auxiliary air is added through duct 11 to form the mixed air and furnace gas. The addition of auxiliary air to the furnace gas not only has the effect of cooling the furnace gas but also has the effect of minimizing the presence of incompeltely oxidized fuel in the furnace gases.

The mixed hot gases formed in chamber 9 are sucked upwardly and enter the evaporating chamber at approximately 1400° F. There they meet the down-flowing recycle liquid at a temperature of about 148° F. and the mixture of liquid and hot gases undergoes a profound and efficient heat exchange. The temperatures of the liquid discharged from the impeller vane rises from 148° F. to about 157° F. while the temperature of the gases in the evaporating chamber is reduced from 1400° F. to about 165° F. Moreover, the gases at this reduced temperature are nearly saturated with water vapor.

After being discharged through conduit 23 and 24 into the primary separating chamber 55, very little temperature change occurs in either the gases or the liquid. The liquid thrown out of the gas stream in chamber 55 and that which drains downwardly by gravity remains at a temperature of approximately 157° F. The gas within chamber 55 remains at a temperature of approximately 165° F. However, the gas when passing through throat 58 and through the spray produced by sprayhead 54 has its temperature reduced to about 157° F. and is found to be saturated with vapor; incidentally, the temperature of 157° F. is the dew-point of the gas under these conditions.

The concentrated liquid collected in basin 56 is discharged into the concentrate vat 31 at a temperature of about 157° F. Some of this concentrate passes under baffle 37 and blends with liquid from the supply vat 28 which likewise has passed under baffle 36. If desired, recycle vat 30 may be provided with an agitating propeller or some mechanical means for thoroughly mixing the concentrate liquid and the stock liquid, but it has been found that the two liquids mix readily and that the recycle mixed liquid has a temperature of about 148° F. The recycle liquid at this temperature is piped through pipe 40 and 41 and is at that temperature when discharged through orifices 50. Similarly, the increment of recycle liquid which is piped through pipe 42 and discharged through nozzle 54 is at a temperature of 148° F. where it is thus able to produce a cooling effect on the effluent gases in throat 58. After the system is on stream an average input of fresh stock is 47 gallons per minute, the average rate of recycle, i. e., liquid charged into pipe 40, is 250 gallons per minute. Thus roughly, four parts of concentrated liquid is recycled with each one part of fresh stock.

In general, the process described above is carried out in a system which is maintained under atmospheric pressure throughout. The location and arrangement of the duct 15 permits the hot gases drawn therethrough to come into direct contact with liquids, which, while they contain large quantities of water, also contain easily decomposable materials and materials which possess high viscosities when not in dilute solution. Notwithstanding these properties of the materials the recycle liquid which is charged into the evaporating chamber at 148° F. does not have its temperature raised much more than about 10° F., even though in direct and intimate contact with gases which initially possess temperatures as high as 1400° F. The efficiency of the heat exchange is apparent from the fact that the liquid temperature is only raised about 10° F. while the gas temperature is reduced from 1400° F. to approximately 165° F., yet the cooled gases are not completely saturated. Moreover, the liquid, since it is meeting a gas stream which is flowing at a rate of approximately 10,000 feet per minute, is first forced into intimate contact with the heating gases, then into a zone of at least partial vacuum, andn thence quickly thrown into a relatively cool zone where chances of decomposition or "caramelization" are virtually eliminated.

The foregoing example illustrates the process with relation to citrus pressed liquors. The process may be employed with the so-called waste liquor, or "fish stick" obtained from the menhaden and related fish processing industries. The temperature of the liquid and the temperature of the exhaust gases discharged from the evaporating chamber and into the primary separating zone vary slightly depending upon the kind of liquid being evaporated and the solid content of the liquid. Thus in the example with citrus press liquors, the exhaust gases are at a temperature of about 165° F. while the concentrated liquid is at a temperature of about 157° F. With pure water, having no solid content, the exhaust gas temperature would be 159° F. and the temperature of unevaporated water would be 157° F. With the "fish stick" or fish pressing waters containing initially about 5 percent to 6 percent dissolved solids, the liquid temperature of the liquid collected in basin 56 will be approximately 155° F. while the gas temperature will be approximately 170° F.

It has been found desirable to utilize the present system, in concentrating materials of the nature described, down to around 20 to 22 Brix or to a solid content of about 20 percent to 22 percent. The concentration, however, may be carried out to a greater degree in this system even up to products having 35 percent solid content as an intermediate thin syrup product. With this higher concentration it will be found that the relative temperature of the liquid concentrate, will be about 162° F., while the relative gas temperature will vary between 165° F. and 170° F. For most materials and under most efficient operations, the general spread between the discharge concentrate liquid temperature and the effluent gas temperature is about 8° F.

Depending upon the nature of the material being concentrated and in spite of the use of the sprayhead 54, some small amount of concentrate and certain amounts of condensed water will be found to exist in chamber 60. Consequently, this chamber is utilized as a secondary separating zone. Liquids are permitted to flow down the sides of the chamber 60 and collect in basin 63 so that the gases finally discharged through duct 61 are substantially purged of entrained solution. These discharge gases, however, contain appreciable heat both sensible and latent and are generally substantially saturated with water vapor. Therefore, they are capable of performing further useful work. In general, the liquids collected in basin 63 are somewhat more diluted with water than is the desired concentrate. Consequently, it is preferred to convey such liquids from pipe 64 and to introduce them into the supply vat 28 for admixture with fresh stock.

It will be understood that certain variations in the foregoing process may be employed. Thus, while the temperature of 1400° F. has been given as a desirable temperature for the heating gases introduced into the evaporating chamber from duct 15, temperatures somewhat lower, such as 800° F. to 1300° F., may be employed and temperatures somewhat higher, such as 1600° F. to 1900 F. may be employed.

Where my process and apparatus are employed to produce a partially concentrated product, i. e., a thin syrup, the temperature of the heating gases may fall within a broad range of about 800° F. to 1900° F. A more specific range of between about 1200° F. and about 1600° F. is preferred since the evaporating process may then be more economically practiced and with the least wear on the equipment. However, where evaporation with extreme rapidity is desired, heating gases at temperatures of 2000° F. or somewhat higher may be employed and where the present apparatus is utilized to make a product of high concentration, even up to 84 Brix, gas temperatures below 800° F. may be employed. In such operations the temperature of the concentrate should be controlled so as not to exceed say 120° F. Such extreme operations, while feasible, are at the expense of fuel and operating efficiency which characterizes the preferred operating conditions.

It will be understood that the temperature of the exhaust gases and of the separated concentrate depend somewhat upon the nature of the solids being concentrated. Some of the solids, by virtue of viscosity and what might be termed water-compatibility resist concentration i. e. retain water with stubborn tenacity. Where this condition exists the spread between the exhaust gas temperature and the temperature of the concentrate, tends to increase. In particularly stubborn solutions this temperature spread may be as high as 15° F. although as mentioned above the desired average is about 8° F.

Where higher or lower than 1400° F. temperatures are employed, consideration should be given to the recycle ratio of mixed concentrate and fresh feed stock. In general, the higher the temperature of the heating gases, the greater the proportion of relatively dilute feed stock in the recycle stock. This leaner ratio will provide more water to be evaporated and the cooling effect of the evaporation of this additional water will compensate for a higher temperature of the heating gases. Conversely, with heating gases at a temperature of below 1400° F., a somewhat higher ratio of concentrate to feed stock will in general be employed. It is preferred to operate at a heating gas temperature of about 1400° F. and with recycle stock formed in the ratio of one part of fresh feed for each four parts of concentrate. This ratio, however, may vary between one to two and one to ten depending upon the nature of the solution being concentrated, the nature of the materials in the solution, and the degree of concentration desired in the final product, as well as of course, the temperature of the heating gases.

The foregoing described apparatus and process possesses very distinct advantages not found in prior art. It is possible to concentrate materials without decomposition, charring, or "caramelization" or sticking to the walls of the apparatus which in prior art systems invariably occurs at points in the apparatus when overheated. It should be remembered that the materials which are successfully concentrated by the present invention are extremely difficult to handle. This difficulty is in part due to the characteristic of forming solutions of progressively higher viscosity as water is being removed from the solution. Prior art efforts to carry out the desired concentration have required expensive equipment, constant personal supervision, and generally agitation of the heated body of liquid so as to avoid the decomposition of the product. The present invention is carried out continuously, requires little personal supervision, and at no stage of the apparatus or process is there any point where overheating causes charring, decomposition, or "caramelization." Another very important factor is that while the effect of vacuum heating occurs in a limited zone in the evaporating chamber, the system is nevertheless entirely an atmospheric system. Consequently, the expensive equipment and expensive controls required for prior art vacuum heating systems is entirely eliminated.

While a preferred embodiment of the invention has been disclosed, it is to be understood that this disclosure is for the purpose of illustration and that various changes and modifications may be made without departing from the spirit and scope of the invention as set forth in the appended claims.

I claim:

1. A continuous process of removing moisture from solutions and suspensions of materials which form syrupy, gel-like, viscous fluids when concentrated which comprises the steps of passing a stream of highly heated combustion gases at high velocity and at atmospheric pressure into an evaporating zone, passing a stream of liquid into said evaporating zone along an axis common to the two streams, countercurrent to said gas stream, and in such manner as to impinge upon the gas stream so as to produce a state of turbulence, forming a single, resultant concurrent stream of the gases, vapors and finely divided liquid particles in turbulent, intimate contact, moving the so-formed resultant linear stream away at substantially right angles to the axis of impingement to a separately enclosed separating zone of quiescence remote from the evaporating zone and withdrawing from said separating zone, cooled, vapor-laden exhaust gas.

2. The process of claim 1 wherein a small amount of the liquid is withdrawn from the stream to be evaporated and intimately contacted with the gases in the separating zone to remove entrained liquid particles.

3. The process of claim 1 wherein a portion of the concentrated liquid is blended with the feed stock liquid and recycled to the evaporating zone while an additional portion of the concentrate is withdrawn as product.

4. The process of claim 1 wherein an additional supply of cooler gas is supplied in an annular stream about the stream of hot gases.

5. A continuous process of removing moisture from solutions and suspensions of materials which form syrupy, gel-like, viscous fluids when concentrated which comprises the steps of passing a stream of highly heated combustion gases at high velocity and at atmospheric pressure upwardly into an evaporating zone, passing a stream of feed stock comprising warm liquid downwardly into said evaporating zone, said streams of gas and liquid having a common axis, to form an inner zone of turbulence within said evaporating zone, bringing said stream of combustion gases and said stream of warm liquid into intimate, heat-exchange, and direction-changing relationship in said evaporating zone and then passing the components of said streams through said zone of turbulence to produce a mixture of warmer concentrated liquid and cooler exhaust gases, passing said mixture into a separate and remote primary separating zone, entirely removed from the influence of the turbulent mixture, and there separating and withdrawing exhaust gases and concentrated liquid from said primary separating zone, conveying said withdrawn concentrated liquid to a collecting zone, withdrawing portions of said concentrated liquid from said collecting zone, blending said withdrawn portions with fresh feed stock and conveying said blended liquid to said evaporating zone as feed stock.

6. A continuous process of removing moisture from solutions and suspensions of materials which form syrupy, gel-like, viscous fluids when concentrated which comprises the steps of passing a stream of hot combustion gases at high velocity, at atmospheric pressure and at temperatures between about 800° F. and about 1900° F. upwardly into an evaporating zone, passing a stream of liquid at temperatures between about 148° F. and about 158° F. downwardly into said evaporating zone, to form an inner zone of turbulence within said evaporating zone, bringing said stream of liquid and said stream of combustion gases into direct, intimate, heat-exchange and direction-changing relationship in said evaporating zone and then passing the components of said streams through said zone of turbulence to produce a mixture of concentrated liquid droplets at a temperature of between about 157° F. and about 162° F. and exhaust gases having a temperature of between about 160° F. to about 170° F., passing said mixture at said temperatures into a separate and remote primary separating zone, entirely removed from the influence of the turbulent mixture, there separating said exhaust gases from said liquid and separately withdrawing concentrated liquid at a temperature between about 157° F. and about 162° F.

7. A continuous process of removing moisture from solutions and suspensions of materials which form syrupy, gel-like, viscous fluids when concentrated which comprises the steps of passing a stream of hot combustion gases at high velocity, at atmospheric pressure and at temperatures between about 1200° F. and about 1600° F. upwardly into an evaporating zone, passing a stream of liquid at temperatures between about 148° F. and about 158° F. downwardly into said evaporating zone, to form an inner zone of turbulence within said evaporating zone, bringing said stream of liquid and said stream of combustion gases into direct, intimate, heat-exchange and direction-changing relationship in said evaporating zone and then passing the components of said streams through said zone of turbulence to produce a mixture of concentrated liquid droplets at a temperature of between about 157° F. and about 162° F. and exhaust gases having a temperature of between about 160° F. to about 170° F., passing said mixture at said temperatures into a separate and remote primary separating zone, entirely removed from the influence of the turbulent mixture, there separating said exhaust gases from said liquid and separately withdrawing concentrated liquid at a temperature between about 157° F. and about 162° F., conveying said withdrawn concentrated liquid to a collecting zone, withdrawing portions of said concentrated liquid from said collecting zone while at a temperature between about 157° F. and about 162° F., blending said withdrawn portions with fresh feed stock at room temperature and conveying said cooled, blended liquid to said evaporating zone.

8. A continuous process of removing moisture from solutions and suspensions of materials which form syrupy, gel-like, viscous fluids when concentrated which comprises the steps of passing a stream of hot combustion gases at high velocity, under induced pressure and at a temperature of about 1400° F., upwardly into an evaporating zone, passing a stream of liquid at a temperature of about 148° F. downwardly into said evaporating zone, to form an inner zone of turbulence within and in direct contact with said evaporating zone, bringing said stream of liquid and said stream of combustion gases into direct, intimate, heat-exchange, and concurrent relationship within said evaporating zone and then passing the components of said streams through said zone of turbulence to produce a mixture of concentrated liquid droplets at a temperature of about 157° F. and exhaust gases at a temperature of about 165° F., passing said mixture at said temperatures into a separate and remote primary separating zone, entirely removed from the influence of the turbulent mixture, there separating said exhaust gases from said liquid and withdrawing said separated liquid at a temperature of about 157° F.

9. A continuous process of removing moisture from solutions and suspensions of materials which form syrupy, gel-like, viscous fluids when concentrated which comprises the steps of passing a stream of hot combustion gases at high velocity, at atmospheric pressure and at a temperature of about 1400° F. upwardly into an evaporating zone, passing a stream of liquid at a temperature of about 148° F. downwardly into said evaporating zone, to form an inner zone of turbulence within and in direct contact with said evaporating zone thereby bringing said stream of liquid and said stream of combustion gases into direct, intimate, heat-exchange, and direction-changing relationship within said evaporating zone to produce a mixture of concentrated liquid droplets at a temperature of about 157° F. and exhaust gases at a temperature of about 165° F., passing said mixture at said temperatures into a primary separating zone, separating said exhaust gases from said liquid and withdrawing said separated liquid at a temperature of about 157° F., conveying said withdrawn liquid to a blending zone and blending part of said withdrawn concentrated liquid at about 157° F. with fresh feed stock at room temperature to produce a blended recycle stock at about 148° F., charging part of said recycle stock to said evaporating zone and conveying another part of said recycle stock to said separating zone, washing exhaust gases discharged from said separating zone with said other part of recycle stock to reduce the temperature of the exhaust gases to about 157° F.

10. A continuous process of removing moisture from solutions and suspensions of materials which form syrupy, gel-like, viscous fluids when concentrated which comprises the steps of passing a stream of hot combustion gases at high velocity, at atmospheric pressure and at a temperature of about 1400° F. upwardly into an evaporating zone, passing a stream of liquid at a temperature of about 148° F. downwardly into said evaporating zone, to form an inner zone of turbulence within and in direct contact with said evaporating zone thereby bringing said stream of liquid and said stream of combustion gases into direct, intimate, heat-exchange, and direction-changing relationof concentrated liquid droplets at a temperature of about 157° F. and exhaust gases at a temperature of about 165° F., passing said mixture at said temperatures into a primary separating zone, separating said exhaust gases from said liquid and withdrawing said separated liquid at a temperature of about 157° F., conveying said withdrawn liquid to a blending zone and blending part of said withdrawn concentrated liquid at about 157° F. with fresh feed stock at room temperature to produce a blended stock at about 148° F. and employing such blended stock as the feed liquid.

11. A process for producing a fluid concentrate from dilute solutions and suspensions which comprises: generating within an enclosed space a fluid flow from a vertically arranged central zone to an annular outer zone, thereby causing the entry of a stream of hot gas from outside the enclosed space, along the axis of the central zone; delivering a stream of dilute solution to the central zone in an axial direction counter-current to the gas stream to be broken up by the kinetic force of the gas stream into liquid droplets, thereby to form an intimate mixture of gas and liquid for rapid heat transfer, delivering such mixture by said flow to said annular zone for continued interchange of heat between said gas and liquid and transferring the mixture from a tangential portion of the annular zone to a remote separately enclosed zone of relative quiescence to permit the gas and vapor from the liquid to separate from the unvaporized, concentrated liquid.

12. The process of claim 11 wherein a portion of the concentrated liquid is admixed with the raw feed for delivery to the initial hot central concentrating zone.

13. The process of claim 12 wherein another portion of the admixed feed and concentrate is intimately contacted with the mixture of liquid and vapor laden gas in the zone of quiescence to entrap fine liquid particles.

References Cited in the file of this patent

UNITED STATES PATENTS

| | | |
|---|---|---|
| 1,491,486 | Marquard et al. | Apr. 22, 1924 |
| 1,831,892 | Thompson | Nov. 17, 1931 |
| 2,010,101 | MacLachlan | Aug. 6, 1935 |
| 2,562,473 | Majonnier | July 31, 1951 |
| 2,684,713 | Vincent | July 27, 1954 |

FOREIGN PATENTS

| | | |
|---|---|---|
| 111,119 | Switzerland | Aug. 1, 1924 |